(12) United States Patent
Calmer

(10) Patent No.: US 10,045,483 B2
(45) Date of Patent: Aug. 14, 2018

(54) NARROW ROW HEAD UNIT EAR GUIDE

(71) Applicant: Marion Calmer, Alpha, IL (US)

(72) Inventor: Marion Calmer, Alpha, IL (US)

( * ) Notice: Subject to any disclaimer, the term of this patent is extended or adjusted under 35 U.S.C. 154(b) by 0 days.

(21) Appl. No.: 14/486,595

(22) Filed: Sep. 15, 2014

(65) Prior Publication Data

US 2015/0000239 A1    Jan. 1, 2015

Related U.S. Application Data

(63) Continuation of application No. 14/094,387, filed on Dec. 2, 2013, now Pat. No. 8,863,487.

(60) Provisional application No. 61/732,246, filed on Nov. 30, 2012.

(51) Int. Cl.
     *A01D 45/02*      (2006.01)

(52) U.S. Cl.
     CPC ......... *A01D 45/021* (2013.01); *A01D 45/023* (2013.01); *A01D 45/025* (2013.01)

(58) Field of Classification Search
     CPC ... A01D 45/023; A01D 45/025; A01D 45/021
     USPC ............. 56/119, 106, 104, 14.2; 460/31, 29; 198/841
     See application file for complete search history.

(56) References Cited

U.S. PATENT DOCUMENTS

| | | | | |
|---|---|---|---|---|
| 1,717,305 A | * | 6/1929 | Beckman | A01D 45/021 56/103 |
| 2,899,794 A | * | 8/1959 | Hadley | A01D 45/023 56/111 |
| 3,462,928 A | * | 8/1969 | Schreiner et al. | 56/104 |
| 3,589,110 A | * | 6/1971 | Schreiner et al. | 56/11.7 |
| 3,646,737 A | * | 3/1972 | Grant | 56/106 |
| 3,759,021 A | * | 9/1973 | Schreiner | A01D 69/06 56/106 |
| 3,832,836 A | * | 9/1974 | Anderson | 56/104 |
| 3,858,384 A | * | 1/1975 | Maiste et al. | 56/14.2 |
| 3,982,385 A | * | 9/1976 | Hyman | 56/106 |
| 4,084,396 A | * | 4/1978 | Fritz et al. | 56/98 |
| 4,227,366 A | * | 10/1980 | Pucher | 56/14.2 |
| 4,244,162 A | * | 1/1981 | Pucher | 56/14.2 |
| 5,009,061 A | * | 4/1991 | Heuling | 56/104 |
| 5,330,114 A | * | 7/1994 | Trenkamp et al. | 241/101.77 |
| 5,704,202 A | * | 1/1998 | Calmer | 56/106 |
| 5,878,560 A | * | 3/1999 | Johnson | 56/66 |
| 5,878,561 A | * | 3/1999 | Gunn | 56/98 |
| 5,881,541 A | * | 3/1999 | Silver et al. | 56/98 |
| 5,911,673 A | * | 6/1999 | Johnson | 56/94 |

(Continued)

*Primary Examiner* — Arpad Fabian-Kovacs

(74) *Attorney, Agent, or Firm* — Glenn Johnson; Nyemaster Goode, PC

(57) ABSTRACT

A narrow row head unit may include a back plate secured to a left gearbox and a right gearbox, which gearboxes may be positioned adjacent one another. Each gearbox may provide rotational power to a pair of stalk rolls and a drive sprocket for a gathering chain. A right mounting tab may be secured to the back plate and the right gearbox, and a left mounting tab may be secured to the back plate and left gearbox. A right plate and leg may extend outward from the back plate adjacent the right mounting tab and a left plate and leg may extend outward from the back plate adjacent the left mounting tab. A narrow row head unit positioned left-of-center on a header may have the gathering chain positioned substantially over the right plate, and right-of-center substantially over the left plate.

14 Claims, 23 Drawing Sheets

(56) References Cited

U.S. PATENT DOCUMENTS

| | | | | |
|---|---|---|---|---|
| 6,226,969 | B1* | 5/2001 | Becker | 56/62 |
| 6,237,312 | B1* | 5/2001 | Becker | A01D 45/021 |
| | | | | 56/119 |
| 6,237,314 | B1* | 5/2001 | Boll | 56/500 |
| 6,412,259 | B1* | 7/2002 | Wiegert | 56/60 |
| 7,874,134 | B1* | 1/2011 | Hoffman | 56/119 |
| 8,196,380 | B2* | 6/2012 | Carboni | 56/62 |
| 8,220,235 | B2* | 7/2012 | Kowalchuk | 56/62 |
| 8,224,534 | B2* | 7/2012 | Kowalchuk | 701/50 |
| 8,276,357 | B2* | 10/2012 | Brown et al. | 56/98 |
| 8,371,914 | B2* | 2/2013 | Cressoni | 460/29 |
| 2010/0071336 | A1* | 3/2010 | Christensen | A01D 45/023 |
| | | | | 56/98 |
| 2010/0072036 | A1* | 3/2010 | Brown | A01D 45/023 |
| | | | | 198/841 |

* cited by examiner

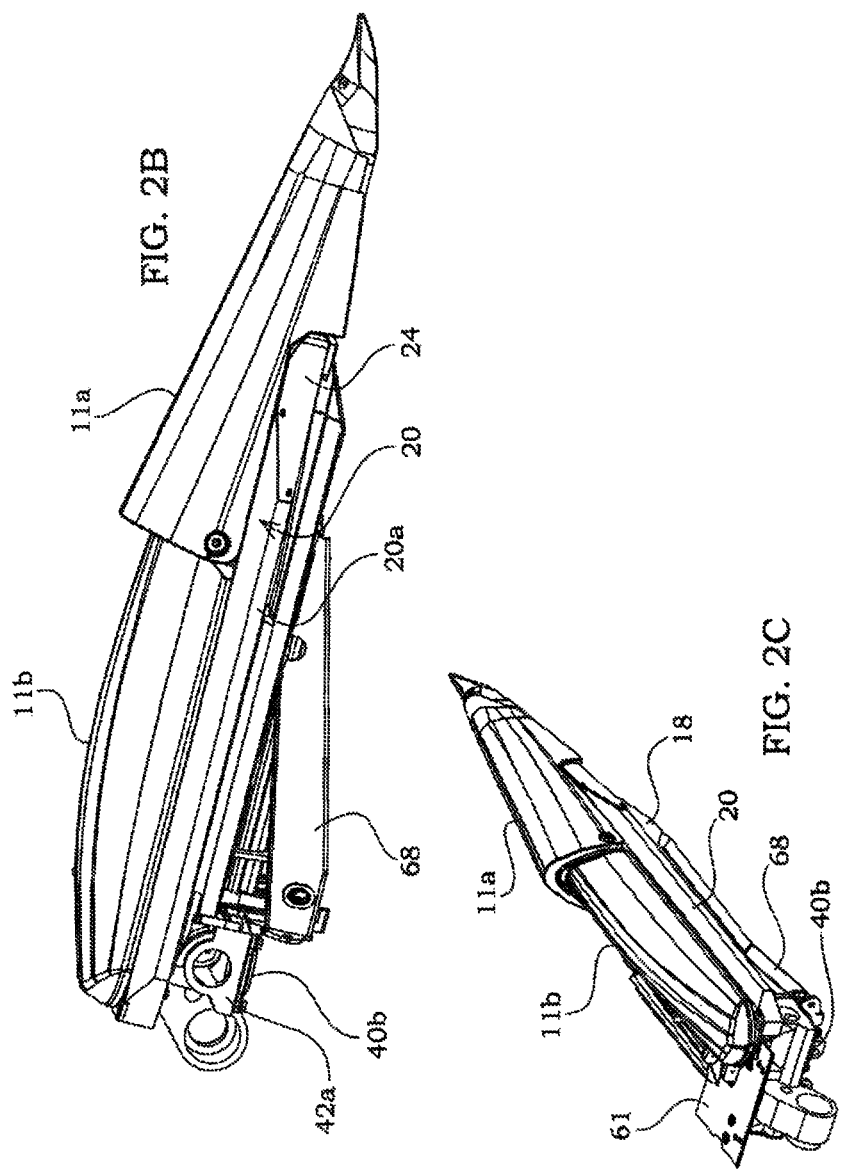

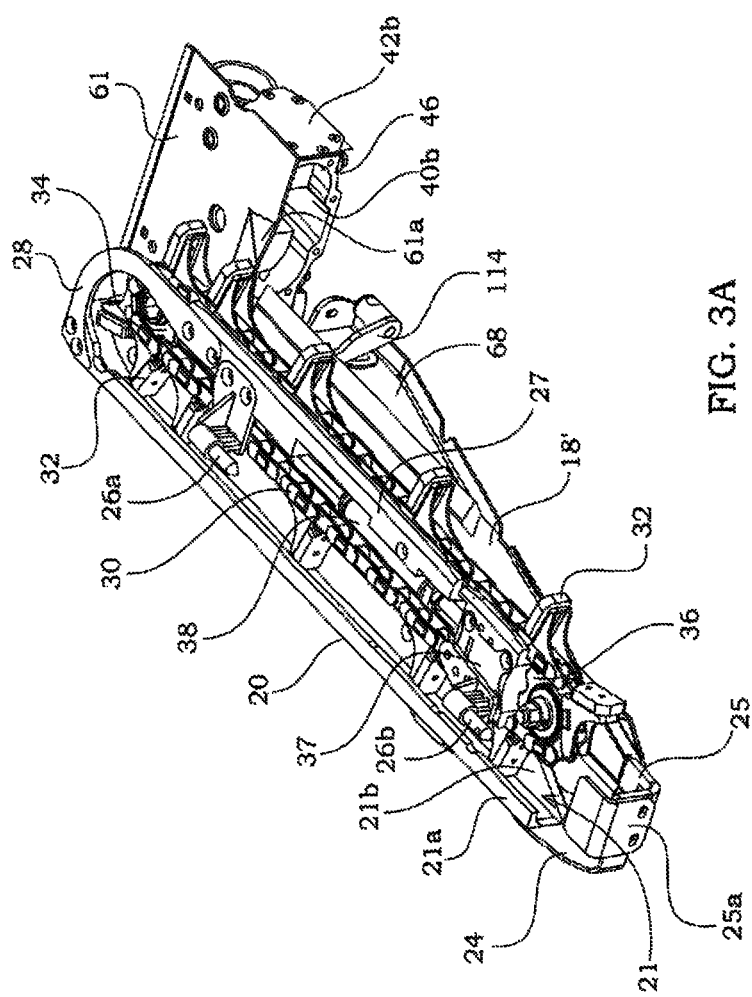

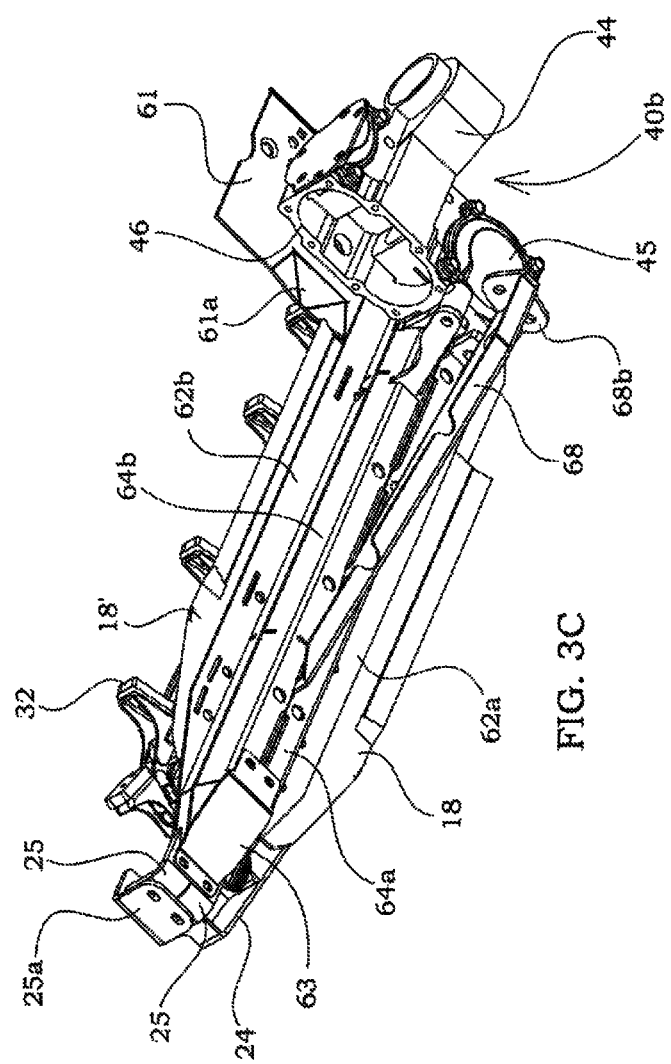

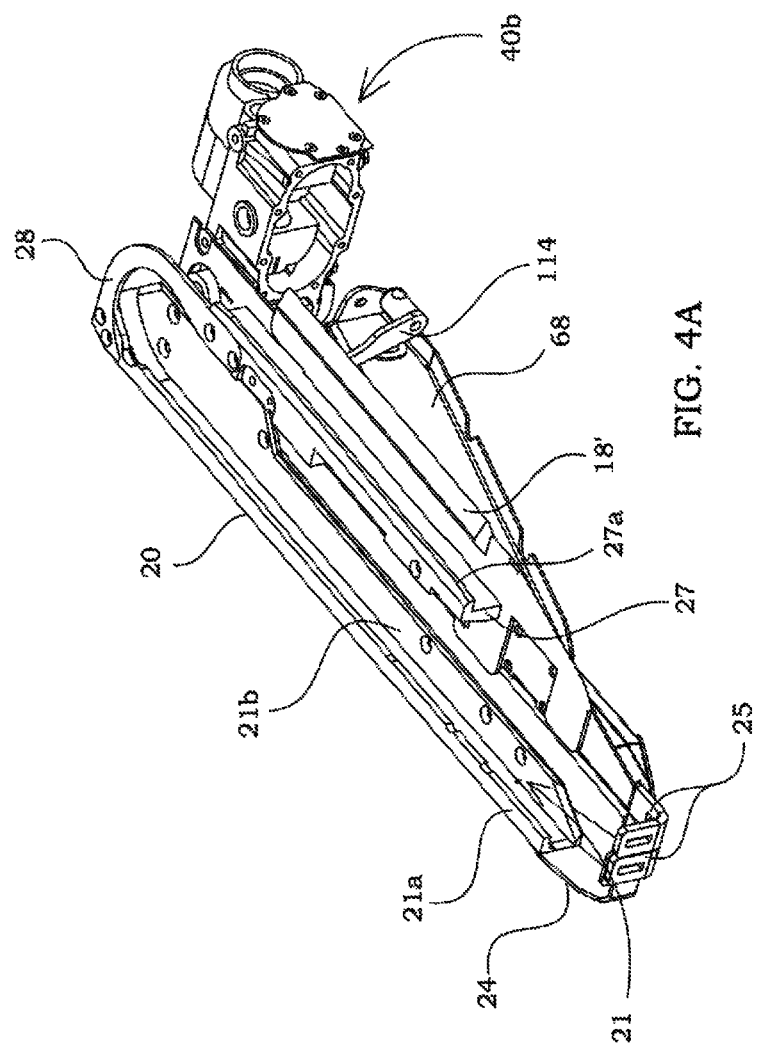

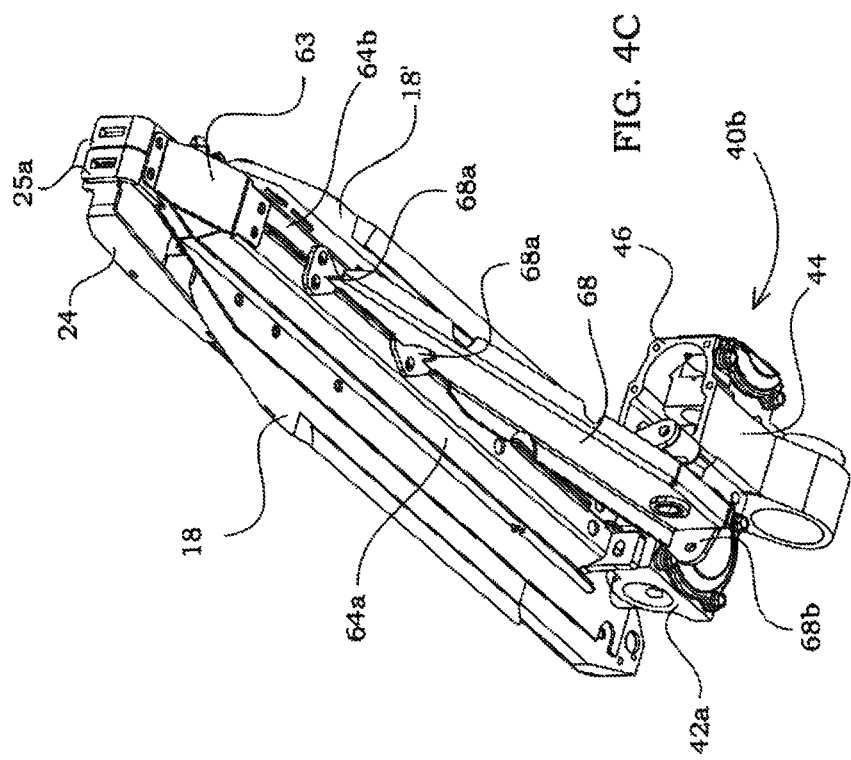

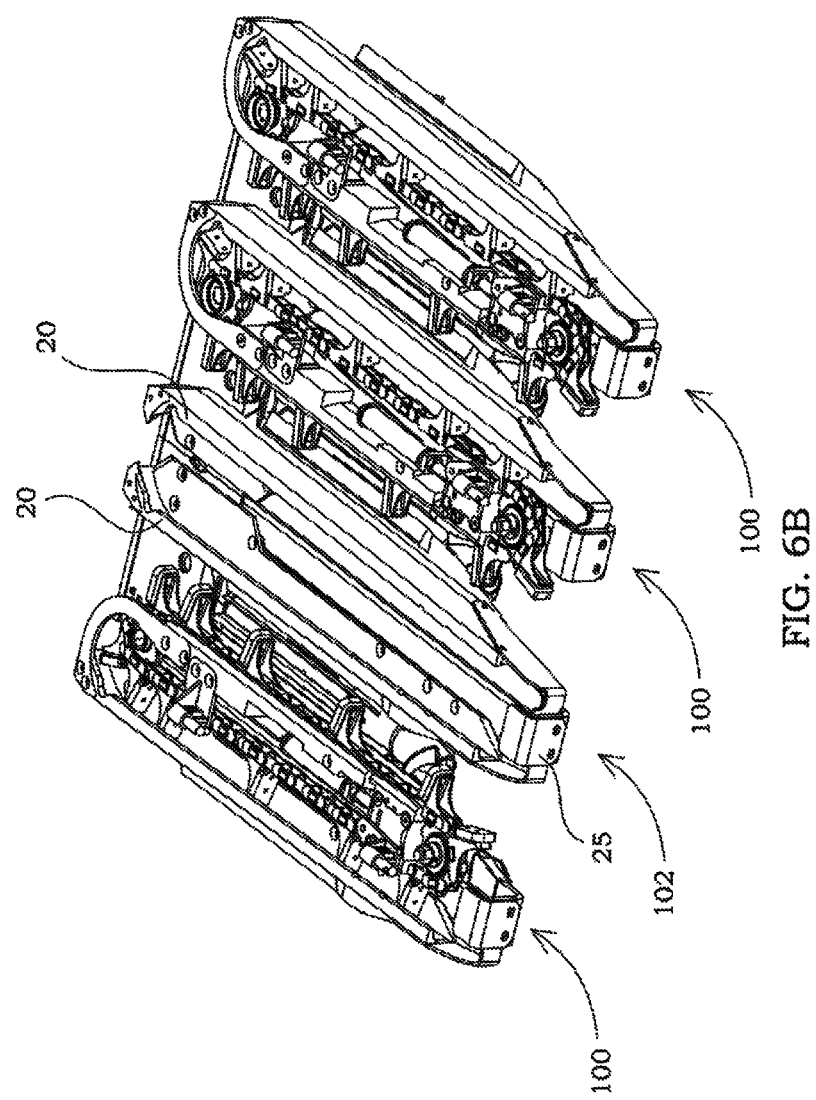

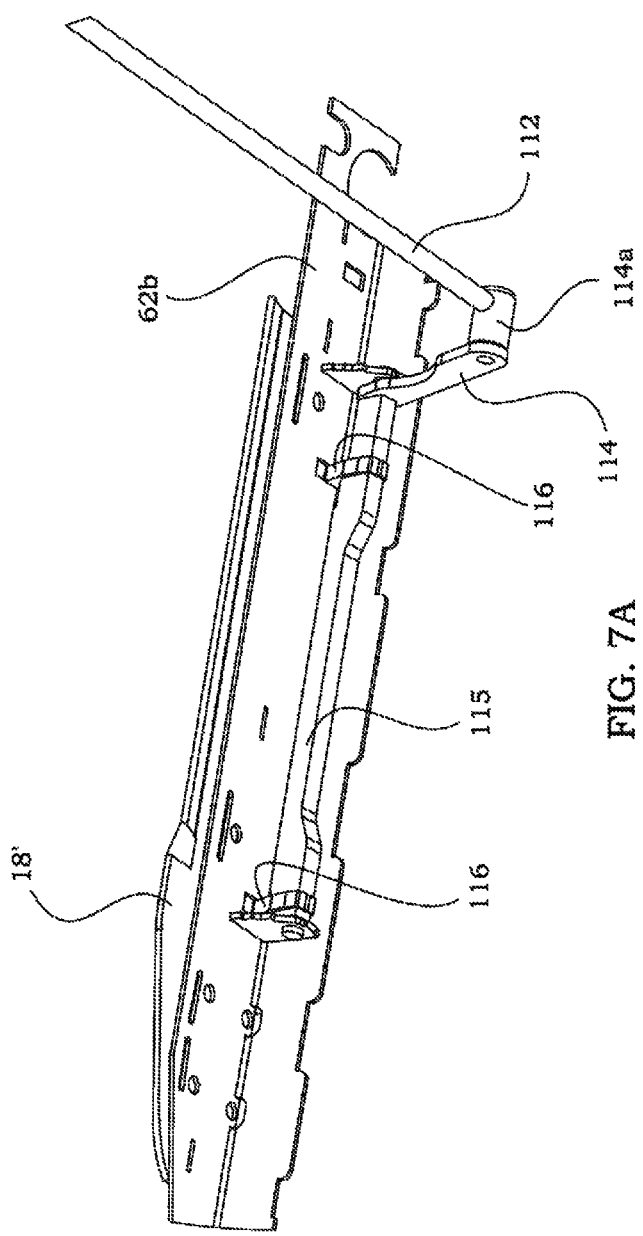

NARROW ROW HEAD UNIT EAR GUIDE

CROSS REFERENCE TO RELATED APPLICATIONS

The present application claims priority from and is a continuation of U.S. patent application Ser. No. 14/094,387 filed Dec. 2, 2013, which application claimed priority from provisional U.S. Pat. App. No. 61/732,246 filed on Nov. 30, 2012, both of which are incorporated by reference herein in their entireties.

FIELD OF THE INVENTION

This invention relates to corn harvesting machinery, specifically the header containing a plurality of row units to strip the ears from the stalk and feed the ears to the harvester for shelling.

STATEMENT REGARDING FEDERALLY SPONSORED RESEARCH OR DEVELOPMENT

No federal funds were used to develop or create the disclosed invention.

REFERENCE TO SEQUENCE LISTING, A TABLE, OR A COMPUTER PROGRAM LISTING COMPACT DISK APPENDIX

Not Applicable

BACKGROUND OF THE INVENTION

There has been a plurality of variations of adjustable width headers for use with harvesters and some of these headers, with adjustable row units, have been in existence for approximately 25 years. The original corn head for use with a harvester was with fixed spacing between the row units and this design was embodied in U.S. Reissued Pat. No. 27,554, which was originally issued in 1966. Subsequently, it was determined that a header in which the width between the row units could be varied to match the various widths of corn rows was desirable. Several embodiments of this variable row width header were and are still marketed. These headers are described in U.S. Pat. No. 3,520,121 patented Jul. 14, 1970, one of the early headers which permitted the modification of row widths in the field. Another narrow row header is disclosed in U.S. Pat. No. 5,704,202, which is incorporated by reference herein in its entirety.

During the past 25 to 30 years since the introduction of the variable row-width planters and headers, much research and development has occurred in the agronomics of the growing of corn. This research has concentrated on reaching the maximum population by varying row widths and spacing between plants. The original corn head and row units were and are capable of harvesting row widths between 28 and 40 inches.

Recently, 12-15 inch rows of corn with varied spacing have been studied for yields and other agronomic affects. Such narrow row widths provide improved erosion control, higher population, higher yield, and better weed control. The narrow rows require less chemical use and in some cases utilize only one-half of much weed control. All of these factors benefit the environment.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

FIG. 2B is a right-side perspective view of a first embodiment of narrow row head unit according to the present disclosure.

FIG. 2C is a rear perspective view of the first embodiment of a narrow row head unit according to the present disclosure.

FIG. 3A is a left-side perspective view of the embodiment of the narrow row head unit shown in FIGS. 2A & 2B wherein various components have been removed for clarity (hood and stalk rolls).

FIG. 3C is a bottom perspective view of the embodiment of the narrow row head unit shown in FIGS. 2A & 2B wherein various components have been removed for clarity.

FIG. 4A is a left-side perspective view of the embodiment of the narrow row head unit shown in FIGS. 2A & 2B wherein various additional components have been removed for clarity (hood, SR, GC, GC sprockets, block, idler tensioner hardware).

FIG. 4C is a bottom perspective view of the embodiment of the narrow row head unit shown in FIGS. 2A & 2B wherein various additional components have been removed for clarity.

FIG. 6B is a left-side perspective view of the arrangement shown in FIG. 6A.

FIG. 7A is a bottom perspective view of an illustrative embodiment of an actuated stripper plate and some associated components, which actuated stripper plate may be used with certain embodiments of a narrow row head unit.

DETAILED DESCRIPTION—ELEMENT LISTING

Figure 1:
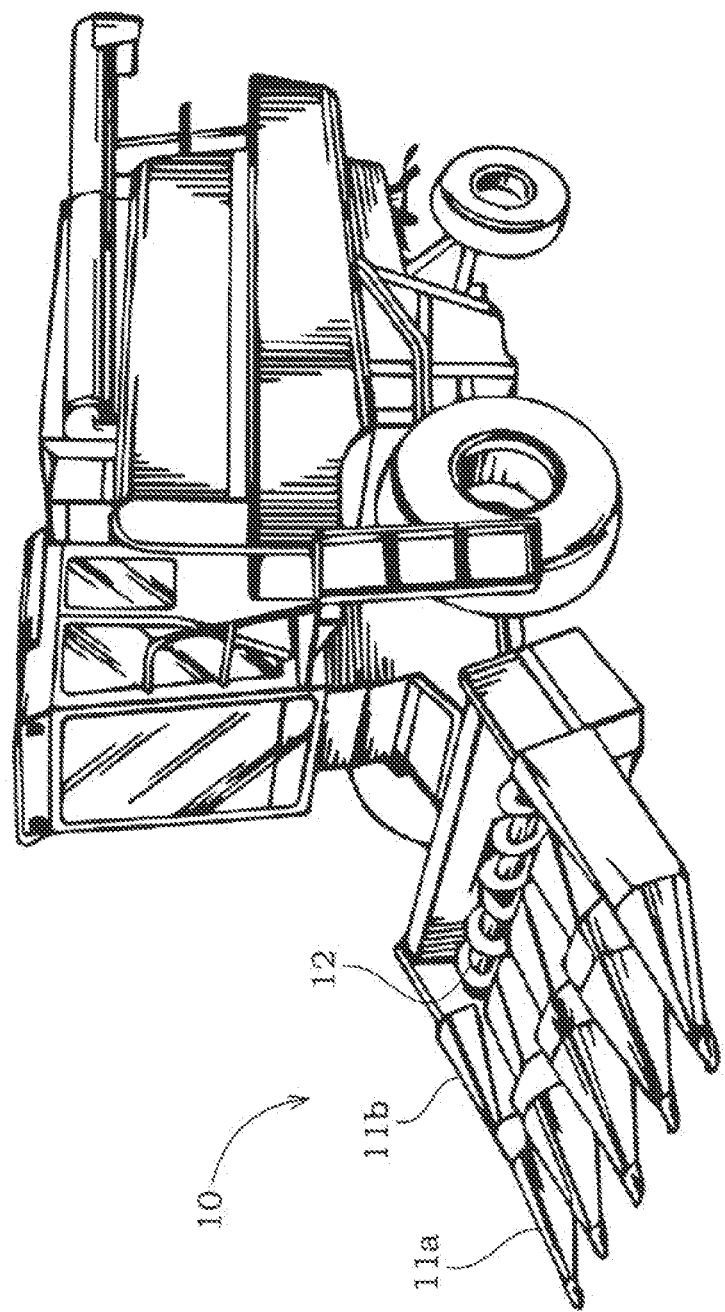
FIG. 1 is a perspective view of a typical harvester and header.

| ELEMENT DESCRIPTION | ELEMENT # |
|---|---|
| Header | 10 |
| Divider | 11a |
| Hood | 11b |
| Auger | 12 |
| Lower beam | 14 |
| Stalk roll | 16 |
| Stripper plate | 18 |
| Actuated stripper plate | 18' |
| Recess | 18a' |
| Finger slot | 18b' |
| Ear guide | 20 |
| Ear guide external surface | 20a |
| Ear guide channel | 21 |
| Channel top | 21a |
| Channel bottom | 21b |
| Ear guide tab | 24 |
| Divider mounting tab | 25 |
| Mounting tab cap | 25a |
| Hood pin | 26a |
| Divider pin | 26b |
| Chain guide | 27 |
| Chain guide ridge | 27a |
| Extractor | 28 |
| Gathering chain | 30 |
| Paddle | 32 |
| Drive sprocket | 34 |
| Idler sprocket | 36 |
| Idler block | 37 |
| Tensioner | 38 |
| Left gearbox | 40a |
| Right gearbox | 40b |
| Gearbox left side | 42a |
| Gear box right side | 42b |
| Gearbox bottom surface | 44 |
| Cover/partial cover | 45 |
| Gearbox mounting surface | 46 |
| Gearbox cap | 48 |
| Cap leg | 48a |
| Frame | 60 |
| Back plate | 61 |
| Recess | 61a |
| Left plate | 62a |
| Rotator tab | 62aa |

-continued

| ELEMENT DESCRIPTION | ELEMENT # |
|---|---|
| Finger slot | 62aa' |
| Right plate | 62b |
| Right rotator tab | 62bb |
| Right finger slot | 62bb' |
| Nose plate | 63 |
| Left leg | 64a |
| Right leg | 64b |
| Leg slot | 64b' |
| Support plate | 65 |
| Left mounting tab | 66a |
| Right mounting tab | 66b |
| Support arm | 68 |
| Leg connector | 68a |
| Lower beam connector | 68b |
| Aperture | 68c |
| Narrow row head unit | 100 |
| Center member | 102 |
| Center member support | 104 |
| Actuator | 110 |
| Rod | 112 |
| Arm | 114 |
| Arm bushing | 114a |
| Arm recess | 114b |
| Arm slot | 114c |
| Rotator | 115 |
| Finger | 116 |
| Finger distal end | 116a |
| Finger slot | 116b |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Referring now to the drawings, wherein like reference numerals designate identical or corresponding parts throughout the several views, FIG. 1 provides a perspective view of a typical harvester with a header 10 attached thereto, wherein the header 10 is specifically configured for use with harvesting corn. As shown, the header 10 may generally include an auger 12 adjacent the harvester and a plurality of dividers 11a and corresponding hoods 11b. Unless otherwise stated, as used herein, "left" and "right" are generally defined from the perspective of a corn plant positioned directly in front of the harvester as opposed to the perspective of the operator of a harvester.

Figure 2A:
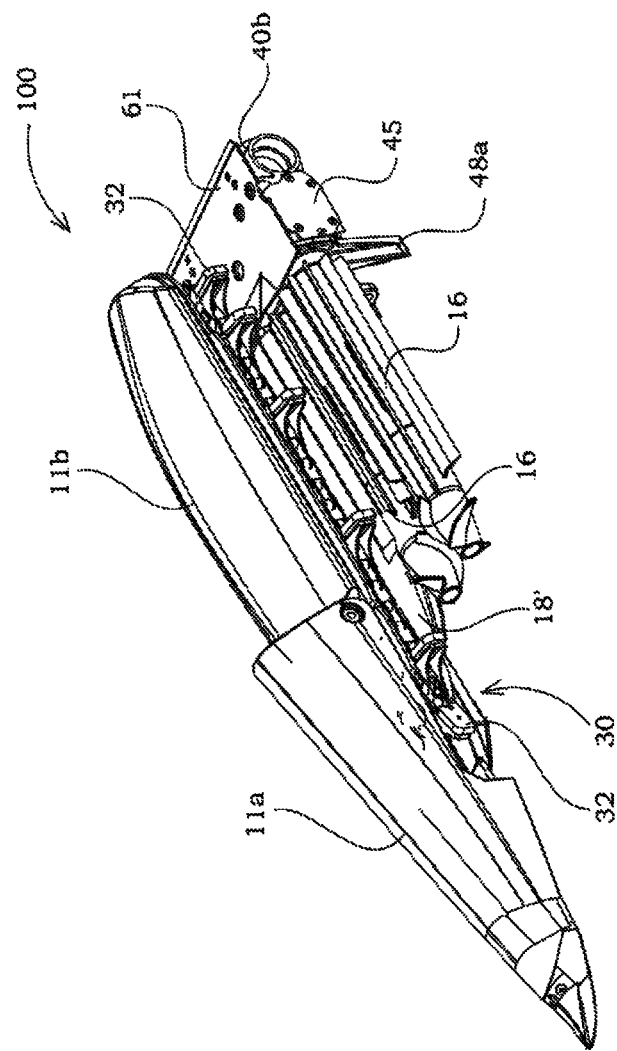
FIG. 2A is a left-side perspective view of a first embodiment of narrow row head unit according to the present disclosure.

FIGS. 2A and 2B provide perspective views of a first illustrative embodiment of a narrow row head unit 100. Although the various illustrative embodiments of a narrow row head unit 100 pictured and described herein are primarily adapted for use in harvesting corn, the specific crop and/or plant for which the narrow row head unit 100 is configured in no way limits the scope of the present disclosure. The narrow row head unit 100 may include a divider 11a, hood 11b, and ear saver (not shown) positioned over a portion of the internal components of the narrow row head unit 100. The ear saver may be configured substantially as a planar member extending outward from an area adjacent the interface between the divider 11a and hood 11b. The ear saver 11c may be oriented such that it resides in a generally vertical plane that is substantially normal to the direction of travel of the harvester during operation. The ear saver may serve to mitigate the likelihood of an ear of corn falling forward away from the harvester during operation. The ear saver may be integrally formed with the divider 11a and/or hood 11b, or it may be separately formed and later engaged with either the divider 11a and/or hood 11b without limitation. Additionally, the presence, shape, or configuration of a divider 11a, hood 11b, and/or ear saver in no way limits the scope of the present disclosure.

As shown, a pair of stalk rolls 16 may be engaged with respective stalk roll drive shafts (not shown) protruding from a gearbox 40a, 40b, which gearbox 40a, 40b may provide rotational energy to the stalk roll drive shafts and gathering chain 30 via a drive sprocket 34. The gearbox 40a, 40b may receive rotational power from the harvester. Stripper plates 18, 18' may be rigidly affixed above the stalk rolls 16, or one or more of the stripper plates 18, 18' may be configured as an actuated stripper plate 18', ad described in detail below. The general configuration and operation of a header 10 will not be discussed further herein for purposes of brevity.

Figure 4B:
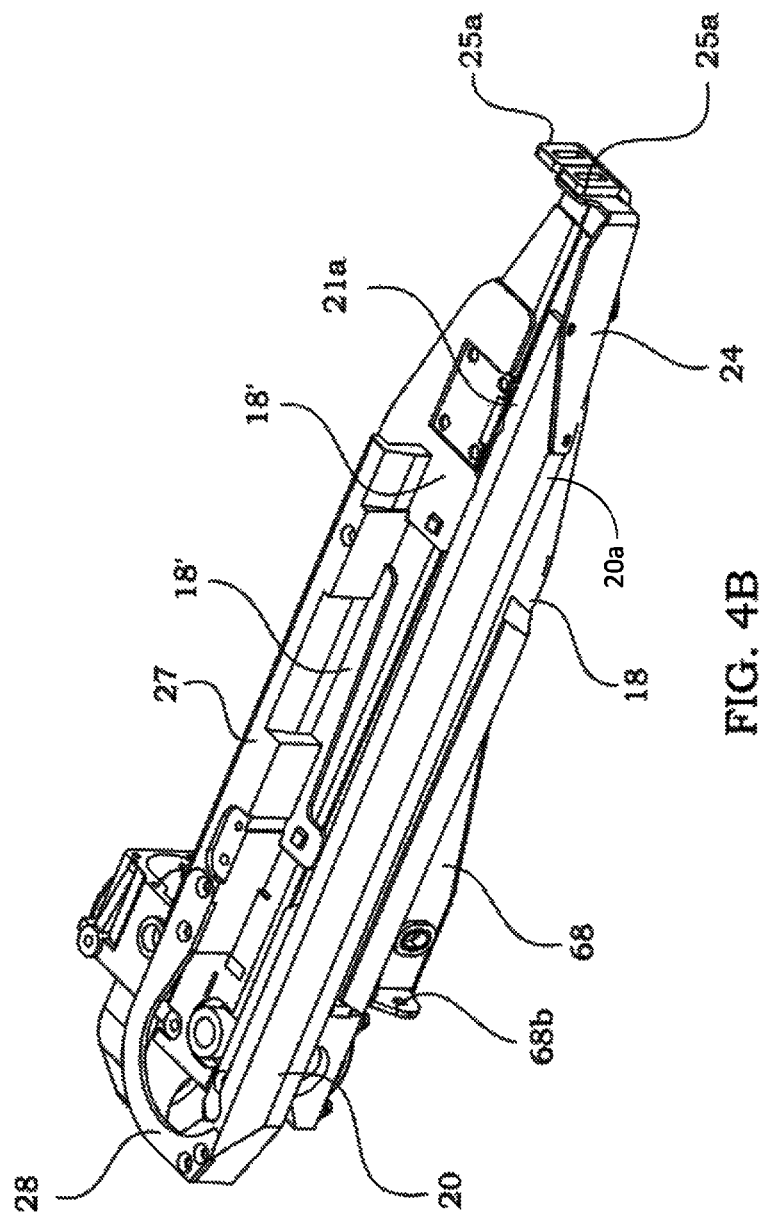
FIG. 4B is a right-side perspective of the embodiment of the narrow row head unit shown in FIGS. 2A & 2B wherein various additional components have been removed for clarity.
Figure 4D:
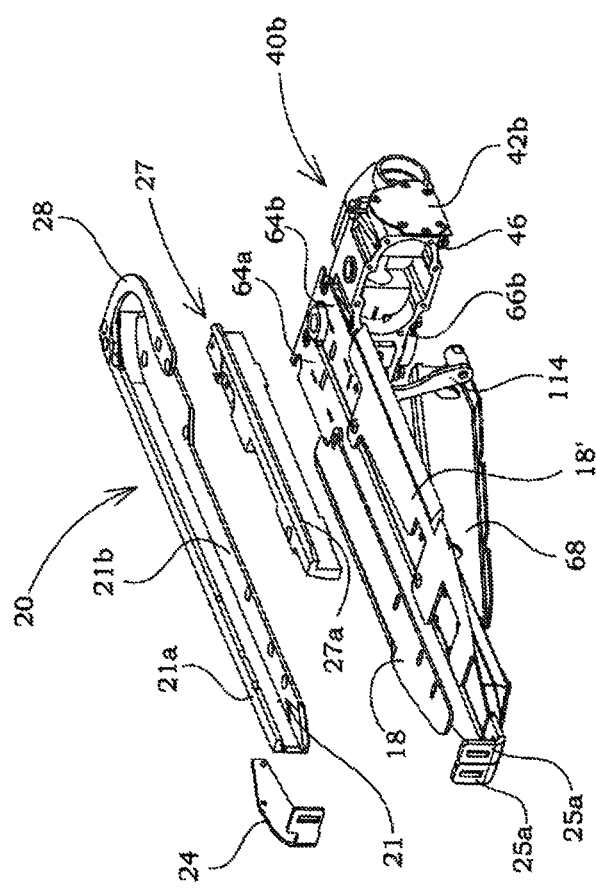
FIG. 4D is a partial exploded view of the embodiment of the narrow row head unit shown in FIGS. 2A & 2B wherein various additional components have been removed for clarity (ear guides and nose pieces pulled apart).
Figure 4E:
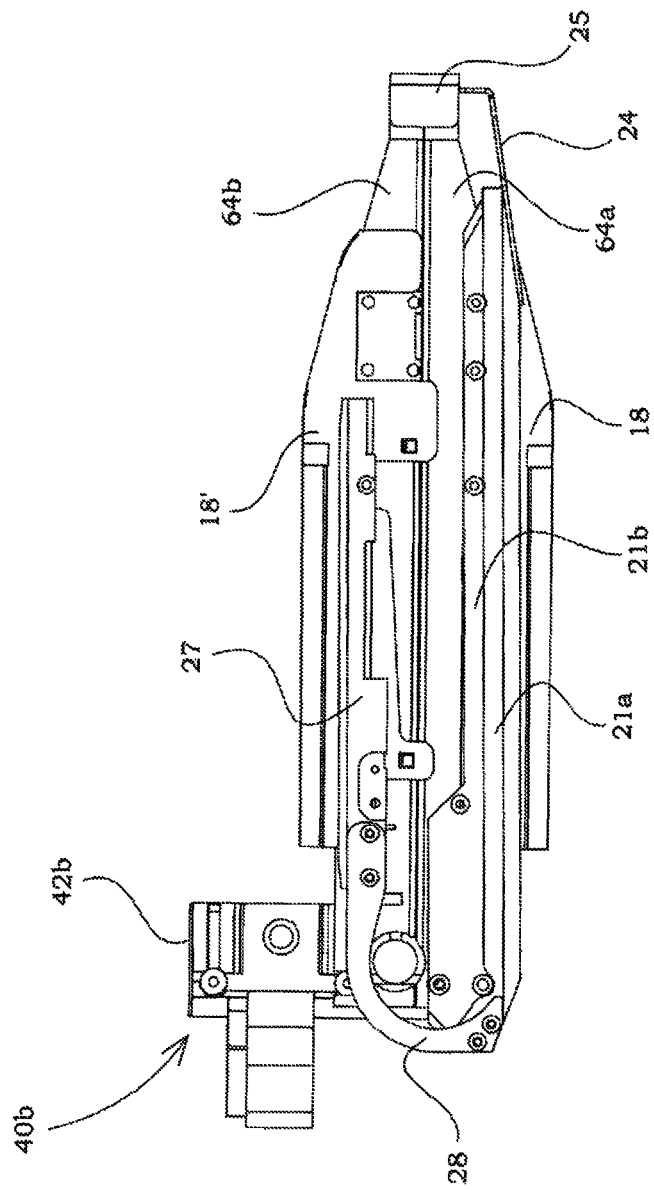
FIG. 4E is a top view of the embodiment of the narrow row head unit shown in FIGS. 2A & 2B wherein various additional components have been removed for clarity.
Figure 5A:
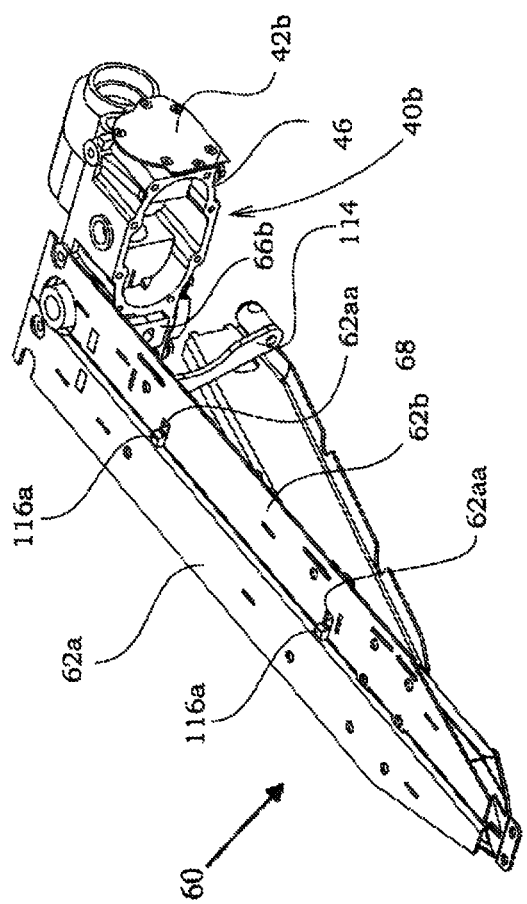
FIG. 5A is a left perspective view of the embodiment of the narrow row head unit shown in FIGS. 2A & 2B wherein various additional components have been removed for clarity (hood, SR, GC, GC sprockets, block, idler tensioner hardware, all ear guide hardware).
Figure 5B:
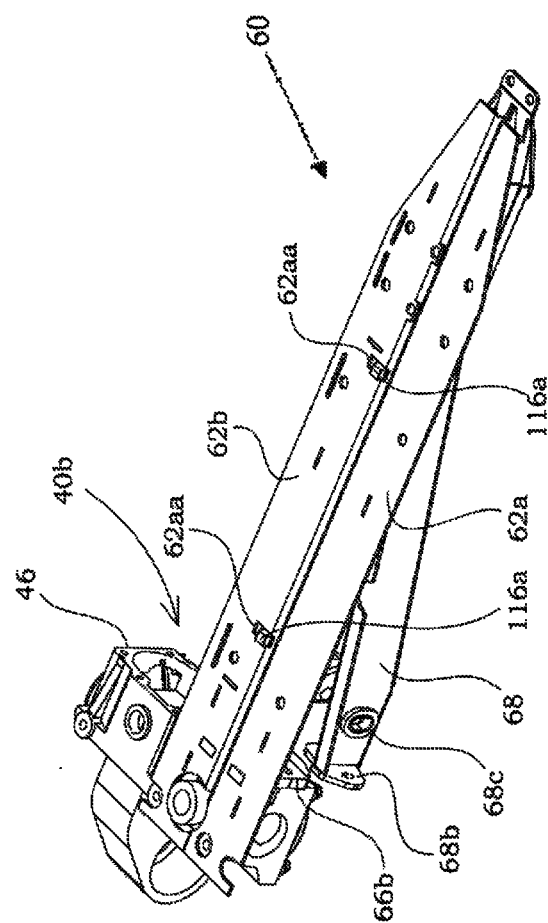
FIG. 5B is a right-side perspective view of the embodiment of the narrow row head unit shown in FIGS. 2A & 2B wherein various additional components have been removed for clarity.
Figure 5C:
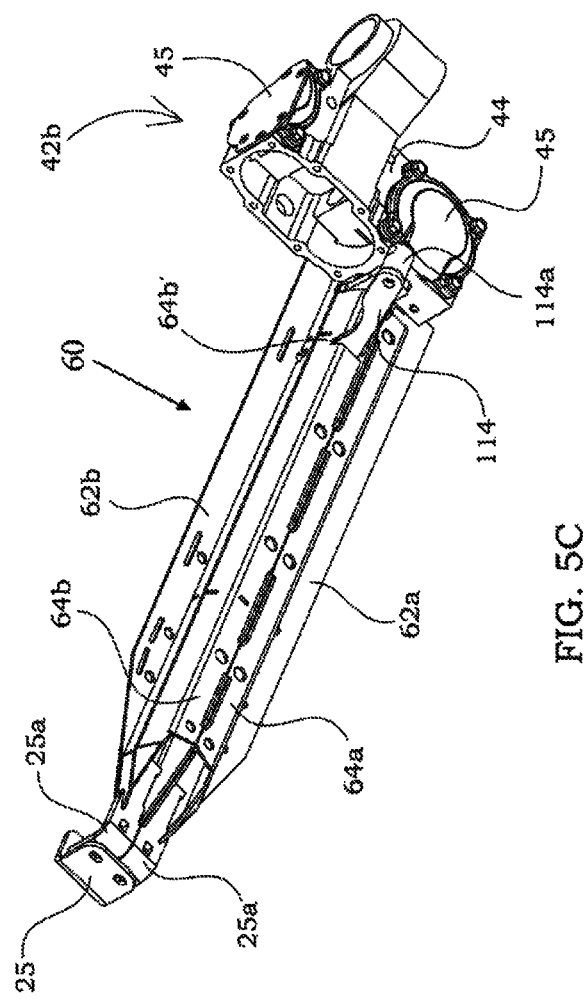
FIG. 5C is a bottom perspective view of the embodiment of the narrow row head unit shown in FIGS. 2A & 2B wherein various additional components have been removed for clarity.
Figure 5D:
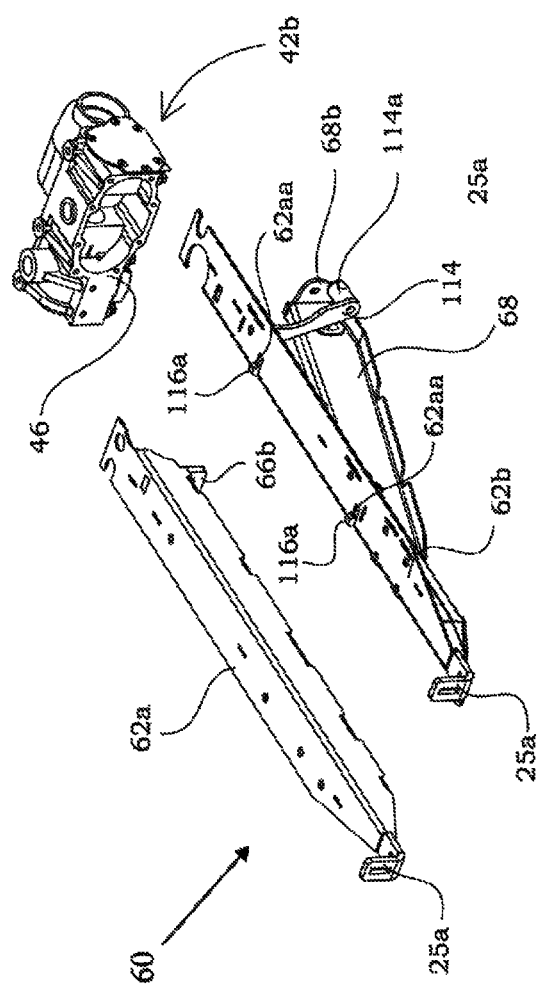
FIG. 5D is a partial exploded view of the embodiment of the narrow row head unit shown in FIGS. 2A & 2B wherein various additional components have been removed for clarity (frame pieces and stalk roll collar exploded).

FIGS. 3A-3E show the first illustrative embodiment of a narrow row head unit 100 with the divider 11a, hood 11b, and stalk rolls 16 removed for purposes of clarity. FIGS. 4A-4E show that embodiment of a narrow row head unit wherein the mounting tab cap 25a, hood pin 26a, divider pin 26b, gathering chain 30, drive sprocket 34, idler sprocket 36, idler block 37, tensioner 38, back plate 61, and associated mounting components also have been removed for purposes of clarity. FIGS. 5A, 5B, and 5D show that embodiment of a narrow row head unit wherein the stripper plates 18, 18', ear guide 20, ear guide tab 24, divider mounting tabs 25, chain guide 27, and extractor 28 also have been removed for purposes of clarity. In FIG. 5C, the support plate 65 also has been removed for clarity.

The divider 11a may be configured with a valley therein on the internal surface (not shown) such that when the divider 11a is positioned on the narrow row head unit 100, the divider 11a may be self-locating via the interaction between the valley and a divider pin 26b. The divider pin 26b may be formed with an aperture therein that corresponds to an aperture in the divider 11a to secure the position of the divider 11a with respect to the other components of the narrow row head unit 100 in conjunction with a divider mounting tab cap 25a positioned toward the front of the narrow row head unit 100. The divider mounting tab cap 25a may be engaged with one or more divider mounting tabs 25, which in turn may be engaged with the left plate 62a, right plate 62b, and/or nose plate 63 as described in detail below with respect to an illustrative embodiment of a frame 60. The hood 11b may be secured and located in a similar manner using a hood pin 26a alone or in conjunction with hood mounting tabs. Any other suitable structure and/or methods may be used to secure and/or locate the divider 11a and/or hood 11b with respect to other components of the narrow row head unit 100 without departing from the spirit and scope of the present disclosure.

Unlike most prior art headers 10, the narrow row head unit 100 as disclosed herein uses just one gathering chain 30 per row of crop. The gathering chain 30 may have a plurality of paddles 32 affixed thereto to push ears of corn toward the harvester during operation. A drive sprocket 34 positioned generally near the rearward end of the narrow row head unit 100 may receive rotational energy from a gearbox 40a, 40b and communicate that rotational energy to the gathering chain 30. An idler sprocket 36 may be intermeshed with the gathering chain 30 at the forward end of the narrow row head unit 100 adjacent an idler block 37. A tensioner 38 (best shown in FIG. 3B) may dictate the position of the idler sprocket 36 along the length of the narrow row head unit 100 so as to allow the user to manipulate the tension of the gathering chain 30.

Generally, it is contemplated that a narrow row head unit 100 may be configured for optimal placement to the right or left of a center member 102 when a plurality of narrow row head units 100 are arranged adjacent one another. From the vantage of the operator of a harvester, the narrow row head unit shown in FIGS. 2A-5D is optimally configured for placement on the right side of a center member 102. Accordingly, it is contemplated that from the vantage shown in FIG. 3A it will be optimal for the gathering chain 30 to travel in a direction that is counterclockwise.

Figure 3B:
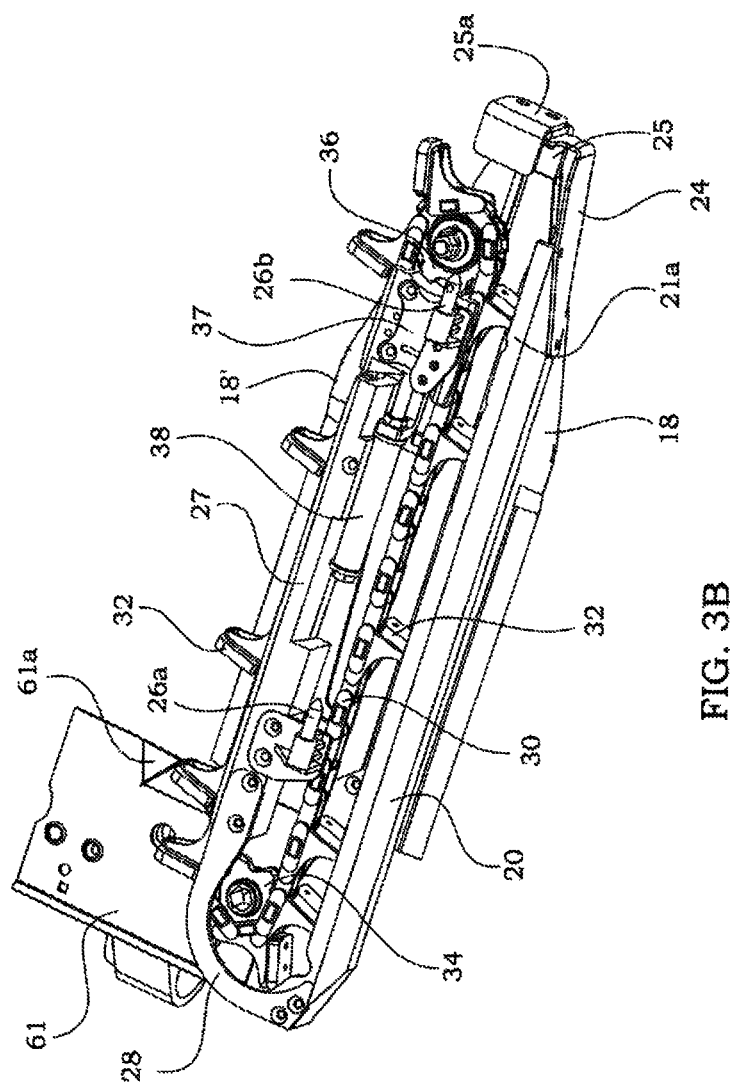
FIG. 3B is a right-side perspective view of the embodiment of the narrow row head unit shown in FIGS. 2A & 2B wherein various components have been removed for clarity.

As best shown in FIG. 3A, the ear guide 20 may be formed with an ear guide channel 21 along the length thereof. In the first illustrative embodiment, this ear guide channel 21 provides space for the paddles 32 of the gathering chain 30 as the paddles 32 return to the front of the narrow row head unit 100 during operation. In the illustrative embodiment, the ear guide channel 21 may be generally bound by a channel top 21a and channel bottom 21b, both of which may be covered by the divider 11a and/or hood 11b during operation. However, in other embodiments the channel top 21a and/or channel bottom 21b may not be required. The ear guide external surface 20a may work in conjunction with the paddles 32 and stripper plates 18 of an adjacent narrow row head unit 100 to guide the ears of corn toward the harvester. A chain guide 27 may be positioned in the gathering chain 30 envelop (best shown in FIG. 3B) to properly route the gathering chain 30 over the stripper plate(s) 18, 18'. The chain guide 27 may be formed with a chain guide shelf 27a adjacent a top surface thereof to mitigate the possibility of the gathering chain 30 moving out of the plane in which it typically travels.

The tensioner 38 may be engaged with the chain guide 27 at one end thereof and the idler block 37 at the other end thereof. As previously mentioned, the tensioner 38 may be configured to allow adjustability of the distance between the drive sprocket 34 and idler sprocket 36 of the gathering chain 30. In the illustrative embodiment, this adjustability may be provided by configuring the idler sprocket 36 so that it pivots with respect to the idler block 37. The idler block 37 may be configured such that it is slidable with respect to the frame 60 of the narrow row head unit 100 along the length thereof. The tensioner 38, in turn, may engage the idler block 37 such that the position of the idler block 37 (in at least one direction along the length of the frame 60) may be bound its engagement with the tensioner 38. This adjustability may allow the narrow row head unit 100 to be configured with a drive sprocket 34 and/or idler sprocket 36 having a narrower diameter than similar components found in prior art header row units, which may require a different length gathering chain 30 than those found in the prior art. The scope of the present disclosure is in no way limited by the structure and/or method used to adjust the tension of the gathering chain 30, and any suitable structure and/or method suitable therefor may be used without limitation.

Figure 3D:
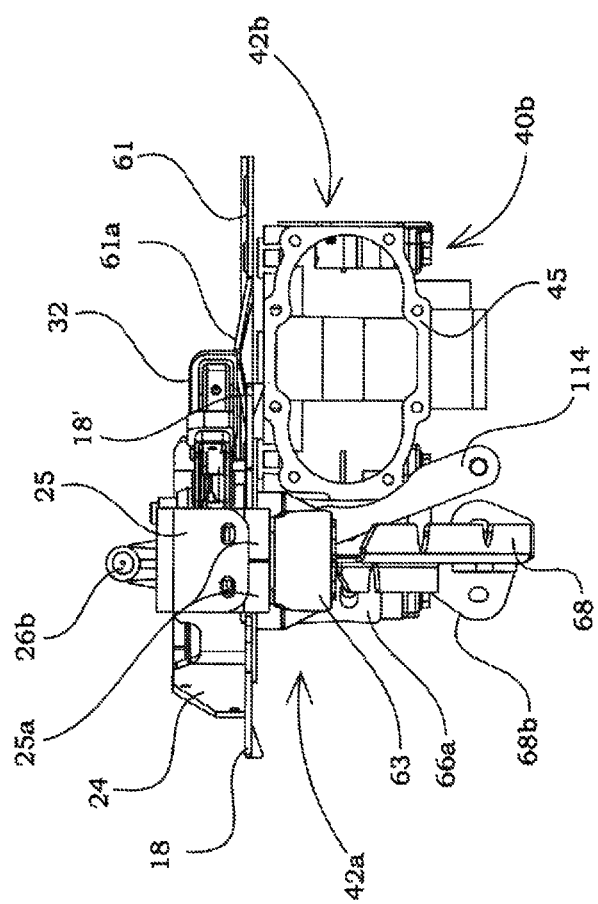
FIG. 3D is a front view of the embodiment of the narrow row head unit shown in FIGS. 2A & 2B wherein various components have been removed for clarity.

An ear guide tab 24 may be positioned adjacent the front end of the ear guide 20 to help properly position corn plants for harvesting. The ear guide tab 24 may operate in conjunction with the paddles 32 on the gathering chain 30 positioned on the adjacent narrow row head unit 100. That is, the ear guide 20 shown in FIGS. 3A-3B may cooperate not with the gathering chain 30 pictured (which may be driven by a drive sprocket 34 powered by the right gearbox 40*b*), but with a gathering chain 30 intermeshed with a drive sprocket 34 from an adjacent narrow row head unit. The gathering chain 30 on the adjacent narrow row head unit 100 (not shown in FIG. 3) may be configured to receive rotational energy from the left gearbox 40*a* (not shown, but positioned adjacent the gearbox left side 42*a* as shown in FIG. 3D) of the narrow row head unit 100 pictured in FIG. 3B (which gearbox 40*a*, 40*b* may constitute the right gearbox 40*b* of the adjacent narrow row head unit 100 not shown in FIG. 3).

The ear guide tab 24 may be integrally formed with the ear guide 20 and/or any other portion of the narrow row head unit 100 that is suitable. Alternatively, the ear guide tab 24 may be separately constructed and later secured to the ear guide 20 or other portion of the narrow row head unit 100. Generally, the ear guide tab 24 may prevent the buckling or folding of corn plants due to engagement with the front end of the narrow row head unit 100 (typically referred to as "hair pinning") and instead help to guide corn plants to an area between corresponding stripper plates 18, 18'.

The ear guide 20 may be engaged with the chain guide 27 via an extractor 28, which may be generally J-shaped as shown in the first illustrative embodiment of the narrow row head unit 100. The extractor 28 may serve to add structural integrity to the narrow row head unit 100. Also, it may be positioned close enough to the back plate 31 (see FIG. 3A) such that ears of corn engaged with a paddle 32 when the paddle 32 is positioned over the back plate 61 are urged away from the drive sprocket 34 due to contact with the extractor 28. The ear guide 20, chain guide 27, and extractor 28 may be constructed of any suitable material, including but not limited to metal, metal alloys, cellulosic or other natural materials, synthetic materials such as nylon or other polymers, and/or combinations thereof.

The ear guide channel 21 may be configured to allow the overall width of the narrow row head unit 100 to be reduced and give the operator flexibility in the size of the drive sprocket 34 and idler sprocket 36 used in the narrow row head unit 100, as previously described above. In the first illustrative embodiment, the drive sprocket 34 may be formed with six teeth and the idler sprocket 36 may be formed with seven teeth. This allows for a suitable resultant speed ratio between the stalk rolls 16 and gathering chain 30 using the stock internal components of a John Deere gearbox 40*a*, 40*b*. However, because the narrow row head unit 100 requires only a single gathering chain 30, the gearbox 40*a*, 40*b* may be cut on one side thereof to eliminate the portion associated with the second gathering chain 30. Accordingly, a gearbox 40*a*, 40*b* configured for use with a narrow row head unit 100 may include one horizontal power input (from the harvester), two horizontal power outputs (for the stalk rolls 16), and one vertical power output (for the drive sprocket 34).

Figure 6A:
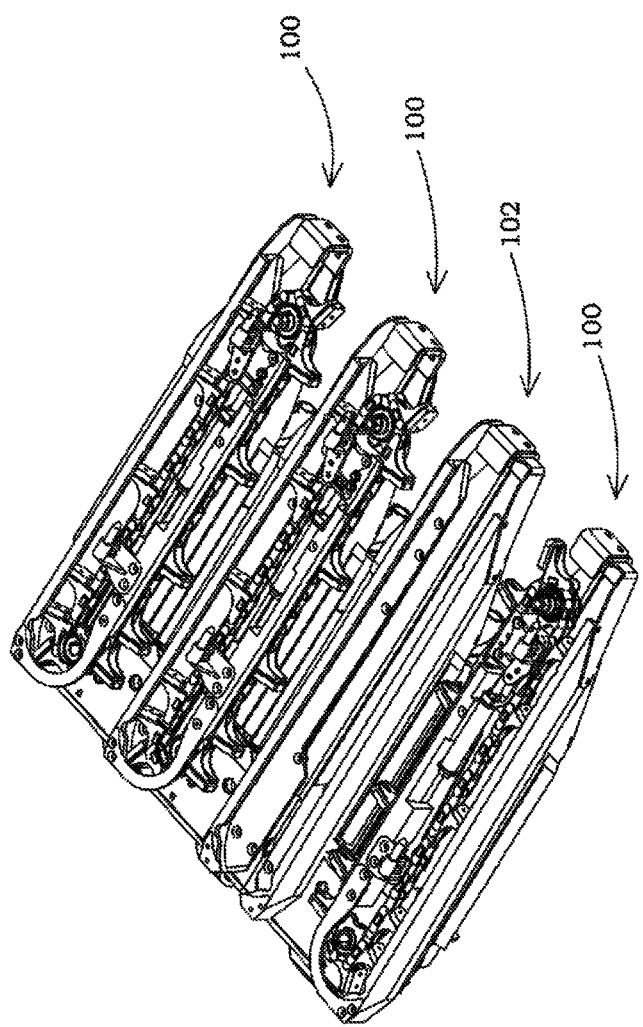
FIG. 6A is a right-side perspective view of the embodiment of the narrow row head unit shown in FIGS. 2A & 2B in which one right-handed narrow row head unit is positioned adjacent a center member and two left-handed narrow row head units are positioned opposite the center member wherein various components have been removed for clarity (like FIG. 3A but with multiple row units).
Figure 6C:
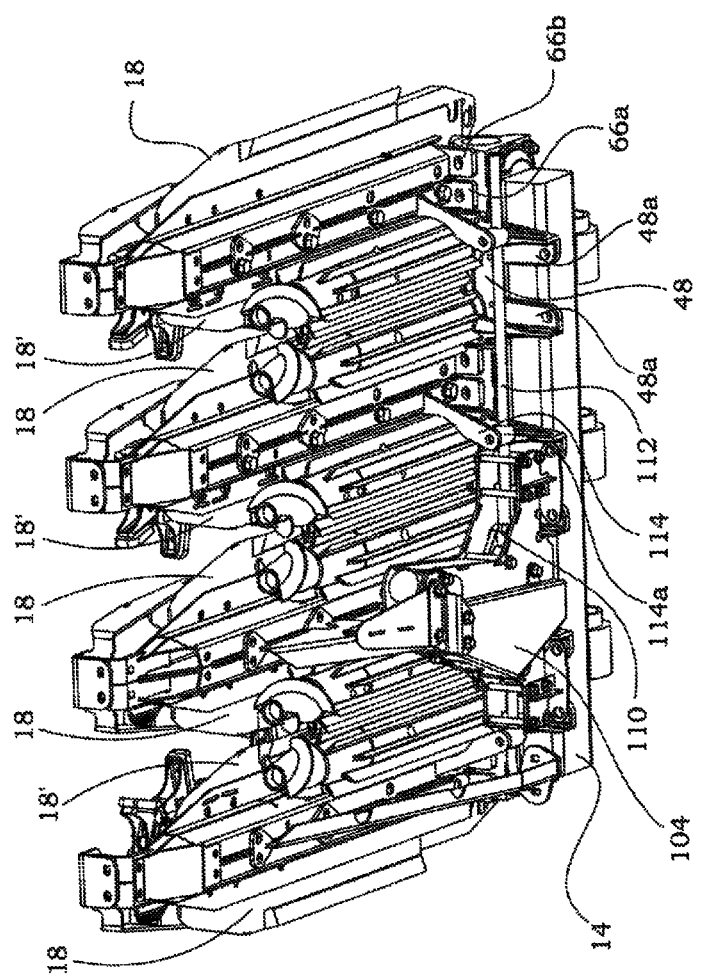
FIG. 6C is a bottom perspective view of the arrangement shown in FIGS. 6A & 6B.
Figure 6D:
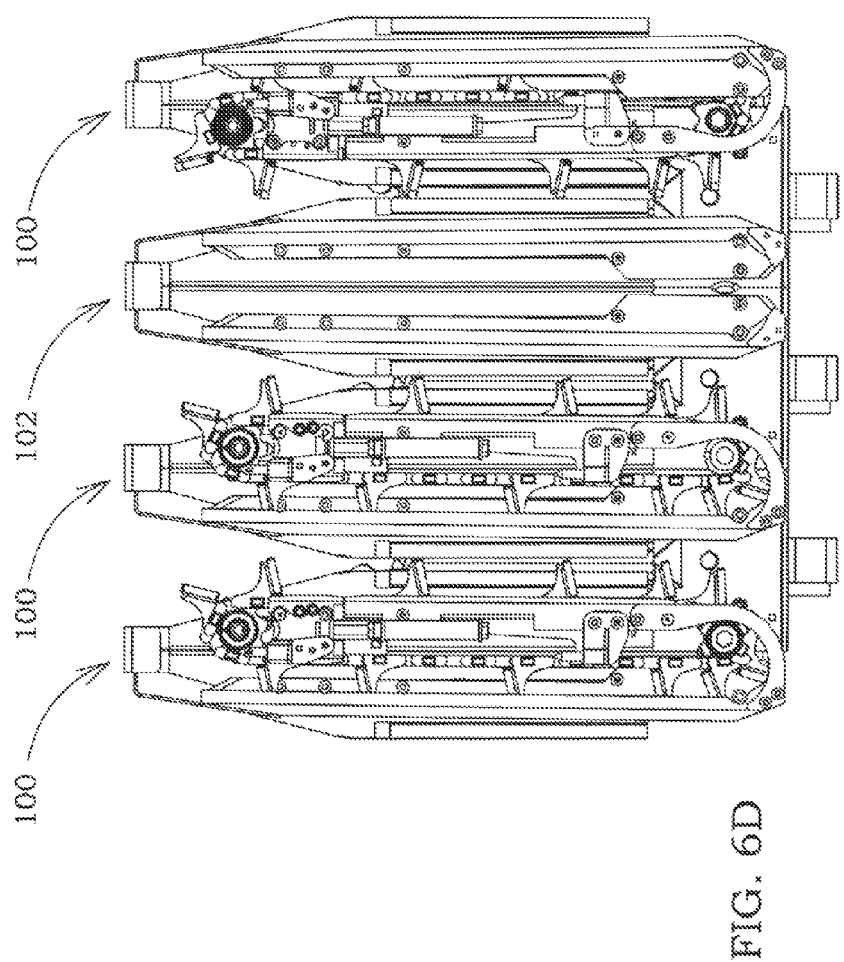
FIG. 6D is a top view of the arrangement shown in FIGS. 6A-6C.

For example, as shown in FIG. 3C, the right gearbox 40*b* may have no gathering chain 30 associated with the gearbox right side 42*b*. However, if the gearboxes 40*a*, 40*b* are configured for position on the left side of a center member 102 (from the vantage of the operator of a harvester) then the gearbox 40*a*, 40*b* may be configured such that there is no gathering chain 30 associated with the gearbox left side 42*a* (i.e., no source of rotational power emanating from the gearbox 40*a*, 40*b* to provide rotational energy to a drive sprocket 34). This configuration is shown in FIG. 6C, which provides a bottom perspective view of one right-handed narrow row head unit 100 (from the vantage of the operator of the harvester) separated from two adjacent left-handed narrow row head units 100 (from the vantage of the operator of the harvester) by a by a center member 102.

In other embodiments, the gearboxes 40*a*, 40*b* may be specifically manufactured for use with the narrow row head unit 100 according to the present disclosure. In such embodiments it is contemplated that the width of the narrow row head unit 100 may be reduced compared to the width of the illustrative embodiments pictured herein. Additionally, in such embodiments the engagement points for other elements of the narrow row head unit 100 may be different than shown for the illustrative embodiments pictured herein, which may serve to optimize the structural rigidity of the narrow row head unit 100.

In other embodiments of the narrow row head unit 100, the size of the drive sprocket 34 and/or idler sprocket 36 may be larger or smaller depending upon the internal speed ratio of the gearbox 40*a*, 40*b*. For example, if the gearbox 40*a*, 40*b* is configured internally such that the rotational speed of the drive sprocket 34 drive shaft (not shown) is higher than in the illustrative embodiment, the drive sprocket 34 may be formed with five or fewer teeth, and the idler sprocket 36 may be formed with six or fewer teeth, further reducing the width of the narrow row head unit 100. Such an embodiment may require that the gathering chain 30 be modified to allow for such a drive sprocket 34 and idler sprocket 36 (e.g., by reducing the number of links in the gathering chain 30, by changing the size and/or shape of the paddles 32, etc.).

It is contemplated that the first illustrative embodiment of a narrow row head unit 100 shown in FIGS. 2A-5D may be more suitable for placement on the right side of the header 10 (from the vantage of the operator of a harvester), wherein the gathering chain 30 is generally positioned over the right plate 62*b* and right leg 64*b*. This is because the direction of rotation of the gathering chain 30 in such a configuration results in the paddles 32 adjacent the rear surface of the drive sprocket 34 to travel in a direction opposite of the direction of travel of the auger 12. Generally such a configuration results in superior transportation of the ears of corn from the gathering chain 30 to the auger 12 and may help to dislodge ears of corn from the gathering chain 30 into the auger 12. However, other configurations may be used without limitation. It is contemplated that all narrow row head units 100 positioned on the right side of a center member 102 (from the vantage of the operator of a harvester) on the header 10 may be so configured. It is also contemplated that for certain embodiments of header 10 having a plurality of narrow row head units 100 thereon that all narrow row head units 100 positioned on the left side of a center member 102 (from the vantage of the operator of a harvester) may be configured such that the gathering chain 30 rotates in the opposite direction (i.e., clockwise from the vantage shown in FIG. 3A), with the ear guide 20, chain guide 27 and other components modified accordingly (which may appear generally as a mirror image to that shown in FIG. 3A), which is shown in FIGS. 6A-6D and described in detail below.

Figure 3E:
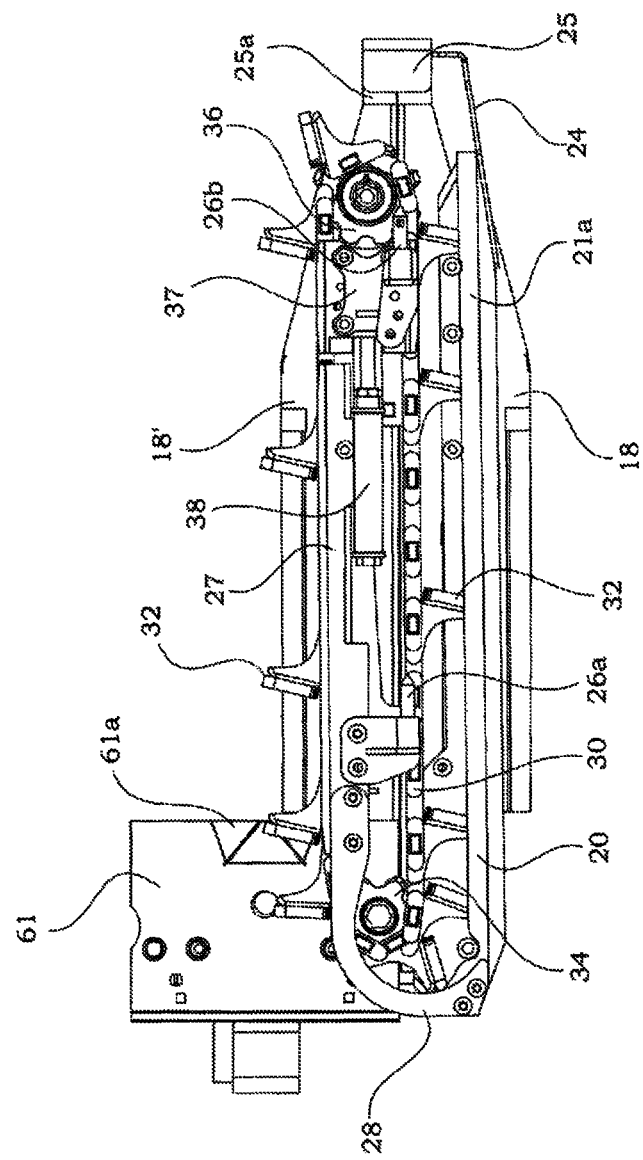
FIG. 3E is a top view of the embodiment of the narrow row head unit shown in FIGS. 2A & 2B wherein various components have been removed for clarity.

Two adjacent narrow row head units 100 generally configured for placement on the left side of a center member 102 (from the vantage of the operator of a harvester) are shown next to a center member 102, which center member 102 is also adjacent one narrow row head unit 100 generally configured for placement on the right side of a center member 102 (from the vantage of the operator of a harvester). For example, in the narrow row head unit 100 shown in FIGS. 2A-5D (which is configured for optimal placement to the right of a center member 102 (from the vantage of the operator of a harvester)), the gathering chain 30 may be positioned substantially over the right plate 62*b*, as shown in FIGS. 4A & 4B. Additionally, this narrow row head unit 100 may be configured such that the rotational power for the drive sprocket 34 emanates closer to the gearbox left side 42*a* as opposed to the gearbox right side 42*b*. However, in a narrow row head unit 100 configured for optimal position to the left of a center member 102 (from the vantage of the operator of a harvester), the gathering chain 30 may be positioned substantially over the left plate 62*a*. Additionally, this narrow row head unit 100 may be configured such that the rotational power for the drive sprocket 34 emanates closer to the gearbox right side 42*b* as opposed to the gearbox left side 42*a*.

A front view of the embodiment shown in FIGS. 3A and 3B is shown in FIG. 3D. As is evident to those of ordinary skill in the art in light of FIG. 3D, a plurality of gearboxes 40*a*, 40*b* may be positioned adjacent one another to form a plurality narrow row head units 100. The gearboxes 40*a*, 40*b* may be configured with a gearbox left side 42*a* and a gearbox right side 42*b*, as previously referenced herein. As shown in FIGS. 6A-6D, adjacent gearboxes 40*a*, 40*b* on a given side of a center member 102 may be configured such that the gearbox right side 42*b* of the left gearbox 40*a* is adjacent to the left side 42*a* of the right gearbox 40*b*. However, as previously described, a left gearbox 40*a* of a first narrow row head unit 100 may be configured as the right gearbox 40*b* of a second narrow row head unit 100 that is immediately adjacent to the left of the first narrow row head unit 100. The gearboxes 40*a*, 40*b* may also be formed with a gearbox bottom surface 44 as clearly shown in FIGS. 3C, 4C, and 5C. The gearbox bottom surface 44 may engage one or more covers 45 and/or partial covers 45 to allow access to the interior of the gearbox 40*a*, 40*b*.

The gearboxes 40*a*, 40*b* may also be configured with a gearbox mounting surface 46 onto which one or more gearbox caps 48 and/or partial gearbox caps 48 may be engaged (as shown in FIGS. 3C, 4C, and 5C). The gearbox cap 48 may seal one side of the gearbox 40*a*, 40*b* from the external environment and help to properly locate and/or support the stalk roll drive shafts (not shown). The gearbox cap 48 may also provide cap legs 48*a* and/or other structure to engage and/or assist in engaging the gearbox 40*a*, 40*b* and/or other components of the narrow row head unit 100 to a lower beam 14 to which multiple gearboxes 40*a*, 40*b* and/or narrow row head units 100 may be mounted.

Referring now to FIGS. 5A-5D, an illustrative embodiment of a first frame 60 will be described. Generally, the illustrative embodiment of a frame 60 may include a back plate 61 (which is shown clearly in FIGS. 3A-3E), left and right plates 62*a*, 62*b*, left and right legs 64*a*, 64*b*, left and right mounting tabs 66*a*, 66*b*, a nose plate 63, and at least one support plate 65. It is to be understood that the illustrative embodiment of a frame 60 as pictured and described herein is for illustrative purposes only, and in no way limits the scope of the narrow row head unit 100 as disclosed and claimed herein. Furthermore, the various components of the frame 60 (and, more generally, the narrow row head unit 100) may be separately formed and later engaged with one another, or they may be integrally formed. Accordingly, the manufacturing and/or fabrication methods and/or techniques used for the narrow row head unit 100 and/or various components thereof in no way limits the scope of the present disclosure.

The left plate and leg 62*a*, 64*a* (and right plate and leg 62*b*, 64*b*) may be configured to form a box or U-channel, or may cooperate with a support plate 65 to form a suitable structure to provide adequate structural integrity and rigidity to the narrow row head unit 100, either alone or in combination with other components thereof. The left and right plates 62*a*, 62*b* may be configured as angled members having a flat portion and a horizontal portion, as shown in the illustrative embodiment. As previously mentioned, the various components may be formed as one integral structure, or they may be formed separately and later engaged with one another. The specific application of the narrow row head unit 100 may dictate the specific configuration of plates 62*a*, 62*b*, legs 64*a*, 64*b*, support plates 65, and/or other components of the narrow row head unit 100, and therefore the specific configuration thereof in no way limits the scope of the present disclosure.

Still referring now to FIGS. 5A-5D, an illustrative embodiment of a frame 60 may be secured to a right gearbox 40*b* and a gearbox 40*a*, 40*b* positioned adjacent to the gearbox right side 42*b* of the right gearbox 40*b*. As previously explained, it is contemplated that the frame 60 shown in FIGS. 5A-5D may be optimal for placement on the right side of a center member 102 (from the vantage of the operator of a harvester). Those of ordinary skill in the art will appreciate that an analogous frame 60 may be configured for optimal placement on the left side of a center member (from the vantage of the operator of a harvester), and that a frame 60 so configured may have components that are substantially a mirror image of those shown in FIGS. 5A-5D. It is contemplated that for some applications it will be advantageous to secure the back plate 61 of one frame 60 to the left and right plates 62*a*, 62*b*, left and right legs 64*a*, 64*b*, left and right mounting tabs 66*a*, 66*b*, support plate(s) 65, and/or adjacent left and right gearboxes 40*a*, 40*b* via welding, bolts, or any other suitable method and/or structure for securing the various components to one another. As shown in FIG. 3D, an illustrative embodiment of a back plate 61 may extend outward from a right gearbox 40*b* such that the back plate 61 may be engaged with the left gearbox 40*a* of an adjacent narrow row head unit 100.

In some embodiments, a support arm 68 may be used to add structural integrity and/or rigidity to the narrow row head unit 100. The support arm 68 may be formed with one or more leg connectors 68*a* for engagement of the support arm 68 with the left and/or right legs 64*a*, 64*b*. The support arm 68 may also be formed with one or more lower beam connectors 68*b*. As with other components of the frame 60, the support arm 68 may be integrally formed with one or more leg connectors 68*a* and/or lower beam connectors 68*b*, or those components may be separately formed and later engaged with one another without limitation. The support arm 68 may also be formed with one or more apertures 68*c* therein. At least one aperture 68 may be configured to accommodate a rod 112 in embodiments of the narrow row head unit 100 having an actuated stripper plate 18', as described in detail below.

The forward ends of the left and right legs 64*a*, 64*b* may be engaged with one another via a nose plate 63, which may also serve to engage the forward ends of the left and right plates 62*a*, 62*b* with one or more divider mounting tabs 25. The divider mounting tabs 25 may be engaged with and left and right plates 62*a*, 62*b*, such that the left and right plates 62a, 62b, and left and right legs 64a, 64b may possess the required structural integrity for the application of the narrow row head unit 100.

In another illustrative embodiment of a narrow row head unit 100, a frame 60 may be configured such that the right plate 62b, right leg 64b, and right mounting tab 66b are positioned on the right side of a pair of stalk rolls 16 (and wherein the right mounting tab 66b is secured to the gearbox mounting surface 46 of a right gearbox 40b) and the left plate 62a, left leg 64a, and left mounting tab 66a are positioned on the left side of that same pair of stalk rolls 16 (and wherein the left mounting tab 66a is secured to the gearbox mounting surface 46 of a left gearbox 40a). The left frame 60 components and right frame 60 components may be mechanically connected to one another via the back plate 61. The back plate 61 may in turn be secured to the top surfaces of both the left and right gearboxes 40a, 40b, as shown in FIGS. 3E, 4E, and 5E for the first illustrative embodiment of a narrow row head unit 100. Additionally, the back plate 61 may be formed with a recess 61a therein to facilitate proper placement and/or removal of ears of corn from the corn plant and/or to facilitate treatment of the corn plant stalk and/or to prevent the corn plant stalk from entering the harvester.

In the embodiment of a narrow row head unit 100 shown in FIGS. 2A-5D, two back plates 61 adjacent a first frame 60 may simultaneously engage adjacent gearboxes 40a, 40b. Referring to FIG. 3E, a first back plate 61 (positioned below a second back plate 61 in the orientation shown in FIG. 3E) may be positioned on the left side of a first frame 60 (or first narrow row head unit 100) and the right side of an adjacent second frame 60 or second narrow row head unit 100 (not shown, but which second frame 60 would be positioned below the first frame 60 in the orientation shown in FIG. 3E). The first back plate 61 may be engaged with both a right gearbox 40b and the left gearbox 40a with respect to the first frame 60 via the left and right mounting tabs 66a, 66b and/or directly via bolting the back plate 61 to the top surface of the gearboxes 40a, 40b. From the present disclosure, it will be apparent to those of ordinary skill in the art that the left gearbox 40a of the first narrow row head unit 100 may also serve as the right gearbox 40b of an adjacent narrow head unit 100 (positioned below the first frame 60 in the orientation shown in FIG. 3E, which would be to the right of first frame 60 from the vantage of the operator of the harvester). Accordingly, the right gearbox 40b of the first narrow row head unit 100 may also serve as the left gearbox 40a of an adjacent narrow row head unit 100 (positioned above the first frame 60 in the orientation shown in FIG. 3E, which would be to the left of the first frame 60 from the vantage of the operator of the harvester).

The second back plate 61 (positioned above the first back plate 61 in the orientation shown in FIG. 3E) may be engaged with both the right gearbox 40b associated with a first narrow row head unit 100 and a left gearbox 40 associated with a third, adjacent frame 60 (or narrow row head unit 100), wherein the right gearbox 40b of the third narrow row head unit 100 may be positioned adjacent to the gearbox right side 42b of the right gearbox 40b of the first narrow row head unit 100. Affixing a frame 60 and/or back plate 61 to both a left and right gearbox 40a, 40b of a given frame 60 and/or narrow row head unit 100 may add strength and torsional rigidity to a header 10 comprised of a plurality of narrow row head units 100. Additionally, the overlapping configuration of back plates 61 with respect to left and right gearboxes 40a, 40b, as well as the configuration of a left gearbox 40a of a first narrow row head unit 100 serving as the right gearbox 40b of a second adjacent narrow row head unit 100 and the right gearbox 40b of the first narrow row head unit 100 serving as the left gearbox 40a of a third adjacent narrow row head unit 100 may increase the structural integrity of each narrow row head unit 100 and a header 10 configured with multiple narrow row head units 100.

Additionally, this configuration may allow for manipulation of the direction that the gathering chain 30 rotates depending on the position of the narrow row head unit 100 with respect to the center member 102. The illustrative embodiment of a center member 102 shown in FIGS. 6A-6F may be configured such that it is generally symmetrical about a vertical plan positioned between the left and right plates 62a, 62b of the center member 102. Generally, the center member 102 may cooperate with an adjacent left-hand narrow row head unit 100 on one side and an adjacent right-hand narrow row head unit 100 on the other side. Accordingly, a gathering chain 30 and associated components may not be required on the center member 102. However, it is contemplated that it may be advantageous for the center member 102 to include two opposing ear guides 20, which opposing ear guides 20 are mirror images of one another. Accordingly, the center member 102 may be configured such that it substantially comprises the right side of a narrow row head unit 100 positioned on the right of the center member 102 and left side of a narrow row head unit 100 positioned on the left of the center member 102.

As previously described, it is contemplated that the configuration of the narrow row head unit 100 shown in FIGS. 3A-5D will optimally be positioned to the right of a center member 102 (from the vantage of the operator of the harvester). As shown in FIGS. 6A-6F, the various narrow row head unit 100, components thereof, frame 60, and/or components thereof may be analogous for narrow row head units 100 positioned on either side of the center member 102 such that they are mirror image of one another. Accordingly, in light of the present disclosure, those of ordinary skill in the art will understand that references to elements such as "left and right plates 62a, 62b"; "left and right legs 64a, 64b"; "left and right mounting tabs 66a, 66b"; etc. are relative, and therefore may be inverted depending on the position of the narrow row head unit 100 with respect to the center member 102 and/or operator of the harvester.

In an illustrative embodiment of a frame 60, a right plate 62b, right leg 64b, and/or right mounting tab 66b (and/or support plate 65) may extend from the back plate 61. A right mounting tab 66b may be secured to a gearbox 40a, 40b (which gearbox 40a, 40b may be positioned adjacent to the right gearbox 40b at the gearbox right side 42b), and a right plate 62b and right leg 64b (and/or support plate 65) may extend outward from an area adjacent the gearbox 40a, 40b. As a corollary, a left plate 62a and leg 64a may extend outward from the back plate 61 in an area adjacent the left mounting tab 66a, as best shown in FIG. 5C.

An illustrative embodiment of complete frames 60 and their relevant components for the illustrative embodiment of a narrow row head unit 100 are shown from the bottom surface in FIG. 6C. As previously mentioned, multiple narrow row head units 100 may be mounted adjacent one another on a lower beam 14 to form a header 10. The narrow row head units 100 mounted left-of-center on the header 10 (i.e., to the right of a center member 102 from the vantage of the operator of the harvester) may be configured such as those pictured in FIGS. 2A-5D, and those right-of-center (i.e., to the left of a center member 102 from the vantage of the operator of the harvester) may be configured substantially as mirror images of those pictured in FIGS. 2A-5D.

Although the illustrative embodiment of a frame 60 as pictured herein includes left and right plates 62a, 62b and left and right legs 64a, 64b, the scope of the present disclosure is not so limited. The optimal configuration and/or components included in the frame 60 will vary from one embodiment of the narrow row head unit 100 to the next. Accordingly, any structure and/or method configured to support all or part of the components required for that specific embodiment of the narrow row head unit 100 will be part of the scope of the present disclosure without limitation. For example, in some embodiments of a frame 60 the right and left legs 64a, 64b may not be required for the frame 60 to possess the desired structural integrity, and in other embodiments the support arm 68 may not be required.

The narrow row head unit 100 disclosed herein may be configured to harvest crops in rows with twelve-inch spacing or less. In other embodiments the narrow row head unit 100 may be configured to harvest crops in rows with 10-inch spacing or less, depending at least upon the type of drive sprocket 34 and idler sprocket 36 used. Accordingly, the scope of the present disclosure is not limited by the specific row spacing for which the narrow row head unit 100 is configured.

Figure 7B:
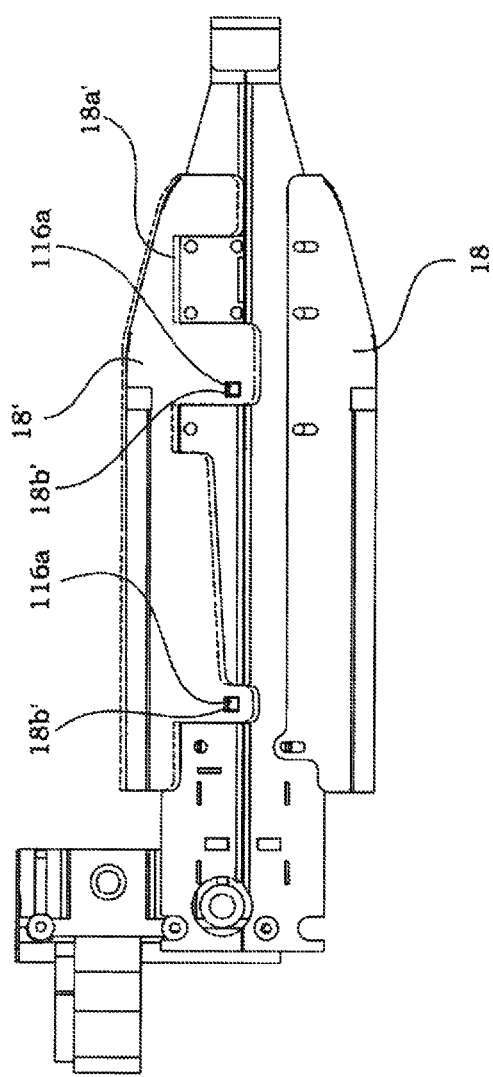
FIG. 7B is a top view of the embodiment shown in FIG. 7A showing the movement of the actuated stripper plate with respect to the frame.

The narrow row head unit 100 may be configured with one or more actuated stripper plates 18', an illustrative mechanism for which is best shown in FIGS. 6C, 7A, and 7B. In the illustrative embodiment, the actuated stripper plate 18' may generally be positioned adjacent the left side of a frame 60 positioned to the right-of-center on the header 10 and adjacent the right side of a frame 60 positioned to the left-of-center on the header 10. However, the scope of the present disclosure is in no way limited by the specific position and/or configuration of the actuated stripper plate 18'. The illustrative embodiment of an actuated stripper plate 18' shown in FIGS. 7A & 7B is configured on a frame 60 that may be optimally positioned on right side of a header 10 (from the vantage of the operator of the harvester).

The actuated stripper plate 18' may be formed with a recess 18a' therein and a finger slot 18b' therein. The position of the actuated stripper plate 18' in the vertical dimension with respect to the stalk rolls 16 may be determined by the chain guide 27 and the engagement of the chain guide 27, actuated stripper plate 18', and respective plate 62a, 62b. Accordingly, the actuated stripper plate 18' may be configured to move toward or away from the cooperating stripper plate 18 in a plane extending along the width of the stripper plate 18.

One or more actuators 110 may be engaged with a center member support 104, as best shown in FIG. 6C. It is contemplated that for many applications it will be advantageous to use hydraulic actuators 110, but the scope of the present disclosure is not limited by the type of actuator 110 used, and extends to all types, including but not limited to hydraulic, electric, pneumatic, and/or combinations thereof. The actuator 110 may engage a rod 112 on a distal end of the actuator 110 with respect to the center member support 104. In the illustrative embodiment, a rod 112 may extend along either half of the header 10 and be configured to affect the position of actuated stripper plates 18' on that half of the header 10, respectively. Accordingly, a first actuator 110 may be engaged with one rod 112 on one side of the center member support 104 and a second actuator 110 may be engaged with another rod 112 on the opposite side of the center member support 104 such that the actuated stripper plates 18' on the left side of the header 10 may be actuated independently of those on the right side. In embodiments of the narrow row head unit 100 having support arms 68, the rod 112 may pass through an aperture 68c formed in the support arm 68, as shown in FIG. 5B. This may prevent the rod 112 from bending and/or buckling under large forces primarily along the length of the rod 112.

Each rod 112 may be engaged with one or more arms 114, wherein each arm 114 may be associated with one actuated stripper plate 18', respectively. The interface between the rod 112 and the arm 114 may be at an arm bushing 114a, which may be configured to allow the end of the arm adjacent the rod 112 to pivot about a specific position along the length of the rod 112. Opposite the arm bushing 114a the arm 114 may be engaged with a rotator 115 via the rotator 115 passing through an arm slot 114c formed in the end of the arm 114 opposite the arm bushing 114a. In the illustrative embodiment, the cross-sectional shape of the arm slot 114c may be generally rectangular so as to interface with a generally rectangular periphery of the rotator 115. The arm 114 may be formed with an arm recess 114b positioned between the arm bushing 114a and the arm slot 114c to accommodate close proximity between the arm 114 and the adjacent stalk roll 16, The rotator 115 may be pivotally engaged with a plate 62a, 62b about one or more rotator tabs 62aa, 62bb. A finger 116 may also be engaged with the rotator 115 about a first end of the finger 116. In the illustrative embodiment, this engagement is accomplished in a manner similar to that between the arm 114 and the rotator 115, wherein the first end of the finger 116 is formed with a finger slot 116b therein through which a portion of the rotator 115 may pass. A finger distal end 116a may extend generally upward from the finger slot 116b and/or rotator 115 through a finger slot 62aa', 62bb' formed in the plate 62a, 62b and engage the finger slot 18b' formed in the actuated stripper plate 18'.

As will be apparent to those of ordinary skill in the art in light of the present disclosure, as an actuator 110 extends, the corresponding rod 112 moves away from the center member support 104. This causes the arm bushing 114a to move in that same direction, which causes the rotator 115 to pivot with respect to the rotator tabs 62aa, 62bb. If the actuated stripper plate 18' is toward the left-of-center (as the actuated stripper plate 18' shown in FIGS. 7A & 7B), the rotator 115 turns clockwise from the perspective of a crop to be harvested. If the actuated stripper plate 18' is toward the right-of-center from that same perspective, the rotator 115 turns counterclockwise. The pivoting motion of the rotator 115 causes the finger distal end 116a to move toward the center of the header 10 (and, consequently toward the corresponding stripper plate 18 on that narrow row head unit 100). Accordingly, retraction of the actuator 110 causes the rotators 115 to turn in the opposite direction, thereby causing the finger distal end 116a to move away from the center of the header 10 (and away from the corresponding stripper plate 18). This motion of the finger distal end 116a may be communicated to the actuated stripper plate 18' via the engagement between the finger slot 18b' and the finger distal end 116a. A recess 18a' may be formed in the actuated stripper plate 18' to allow the actuated stripper plate 18' to move along the previously described plane without interfering with the idler block 37.

Optimizing all the critical speed ratios, as required by high-speed, high-yield, and/or harvesting in leaning, lodged, or broken plant conditions, may require the effective circumferential speed and interaction of the multi-length, multi-angled, multi-fluted, multi-vaned stalk rolls 16. Applicant understands that the various speed ratios are interrelated and effective row unit designs must recognize and incorporate these varied speed ratios to ensure corn plant(s) remain vertical or lean slightly toward the header 10 upon engagement. Harvesting corn plants in this manner promotes ear separation in the appropriate position of the narrow row head unit 100 and away from the front thereof. Although the illustrative embodiments of a narrow row head unit 100 disclosed herein are generally optimized for harvesting corn plants, the scope of the present disclosure is not so limited, and the narrow row head unit 100 may be configured to harvest any suitable crop, including but not limited to grains, beans, legumes, and/or any other crop without limitation.

The gathering chains 30 may be formed with enlarged paddles 32, which may help to direct the corn plants and/or ears of corn toward the harvester. The corn plants may be further centered into between adjacent narrow row head units 100 by stripper plates 18, dividers 11a, and/or ear guide tabs 24 described in detail above. Enlarged paddles 32 may have an increased angle relative to the gathering chain 30, which allow the paddles 32 to engage a larger number of corn plants than traditional paddles 32, especially when harvesting leaning and/or lodged corn. Additionally, enlarged paddles 32 may increase the conveying capacity of the narrow row head unit 100.

The narrow row head unit 100 and various elements thereof may be constructed of any material known to those skilled in the art that is appropriate for the specific application thereof. For example, steel, metallic alloys, synthetic materials, natural materials, combinations thereof, and/or any other suitable material may be used without limitation.

It should be noted that the narrow row head unit 100 is not limited to the specific embodiments pictured and described herein, but is intended to apply to all similar methods and apparatuses for harvesting crops with row spacing equal to or less than twelve inches. Accordingly, modifications and alterations from the described embodiments will occur to those skilled in the art without departure from the spirit and scope of the narrow row head unit 100. It is understood that the narrow row head unit 100 as disclosed and defined herein extends to all alternative combinations of one or more of the individual features mentioned or evident from the text and/or drawings. All of these different combinations constitute various alternative aspects of the narrow row head unit 100. The embodiments described herein explain the best modes known for practicing the narrow row head unit 100 and will enable others skilled in the art to utilize the same. The claims are to be construed to include alternative embodiments to the extent permitted by the prior art.

Having described the preferred embodiments, other features, advantages, and/or efficiencies of the narrow row head unit 100 will undoubtedly occur to those versed in the art, as will numerous modifications and alterations of the disclosed embodiments and methods, all of which may be achieved without departing from the spirit and scope of the narrow row head unit 100.

What is claimed is:

1. An ear guide for a narrow row head unit, wherein said ear guide is formed with an ear guide channel on an interior portion thereof, wherein a height of said ear guide channel is defined by a channel bottom and a channel top, wherein said ear guide channel is positioned adjacent to a first gathering chain on said narrow row head unit having a paddle extending outward therefrom, wherein said ear guide channel is sized and shaped to allow a distal portion of said paddle engaged with said first gathering chain to be positioned in and travel along a length of said ear guide channel, and wherein an ear guide external surface opposite said ear guide channel is positioned adjacent a second gathering chain adjacent said first gathering chain.

2. The ear guide according to claim 1 wherein said ear guide is further defined as being engaged with a top surface of a frame.

3. The ear guide according to claim 2 wherein said first gathering chain is further defined as receiving kinetic energy from a drive sprocket engaged with said first gathering chain.

4. The ear guide according to claim 3 wherein said drive sprocket is further defined as receiving kinetic energy from a first gearbox engaged with said drive sprocket.

5. The ear guide according to claim 2 wherein said frame is further defined as a left and right leg and a left and right plate, and wherein said ear guide is further defined as being engaged with said left plate.

6. The ear guide according to claim 2 wherein said frame is further defined as a left and right leg and a left and right plate, and wherein said ear guide is further defined as being engaged with said right plate.

7. The ear guide according to claim 5 wherein said first gathering chain is further defined as being positioned primarily above said right plate.

8. The ear guide according to claim 6 wherein said first gathering chain is further defined as being positioned primarily above said left plate.

9. The ear guide according to claim 1 wherein said ear guide channel further comprises:
   a. a channel top defining an upper limit of said ear guide channel; and,
   b. a channel bottom defining a lower limit of said ear guide channel, wherein a distance from said channel top to said channel bottom defines a height of said ear guide channel, and wherein a height of said paddle on said first gathering chain is less than said height of said ear guide channel.

10. The ear guide according to claim 1 wherein said ear guide is further defined as being fashioned as an integral structure such that said ear guide channel and limits thereof are fashioned as said integral structure.

11. The ear guide according to claim 1 wherein said ear guide channel is further defined as being configured to allow said distal portion of said paddle engaged with said first gathering chain to be positioned in and travel along a length of said ear guide channel when said paddle is moving in a direction from a rearward portion of said narrow row head unit to a forward portion thereof.

12. The ear guide of claim 1 wherein the ear guide has a channel top extending over the ear guide channel.

13. The ear guide of claim 12 wherein the ear guide channel is enlarged to work cooperatively with enlarged paddles.

14. An ear guide for a narrow row head unit, said ear guide comprising:
   a. an interior portion;
   b. an ear guide channel formed on said interior portion,
   c. a channel top defining an upper limit of said ear guide channel;
   d. a channel bottom defining a lower limit of said ear guide channel, wherein a distance from said channel top to said channel bottom defines a height of said ear guide channel, wherein said ear guide is configured for use with a gathering chain positioned adjacent said ear guide and having a paddle extending outward therefrom, and wherein said height of said ear guide channel allows a distal portion of said paddle engaged with said gathering chain adjacent said ear guide to be positioned within and travel along a length of said ear guide channel within said height.

\* \* \* \* \*